United States Patent Office 2,831,125
Patented Apr. 15, 1958

2,831,125

GENERATION CONTROL WITH NORMAL-ASSIST AND EMERGENCY-ASSIST ACTIONS

Nathan Cohn, Jenkintown, Pa., assignor to Leeds and Northrup Company, Philadelphia, Pa., a corporation of Pennsylvania Application June 22, 1956, Serial No. 593,141

20 Claims. (Cl. 290—4)

This invention relates to control of the generation of electrical power by component generating areas, stations or units of a distribution network operating under a schedule with respect to the remainder of the network. For brevity, such areas, stations or units are generically termed generating sources.

In accordance with the present invention, the generation of selected individual generating sources of a group is programmed for a range of total generation which may be demanded of the group; for deviations from schedule within a preset zone, the generation of individual sources of the group may be controlled rigidly to follow the program: for deviations from schedule beyond the preset zone, the rigidity of the program is relaxed, permitting the controlled generation of any one or more of the individual sources to be within a "normal-assist" band having preset limits, one or both of which departs from the rigid program value otherwise demanded of that source. It is preferably further provided that for still greater deviations indicative of emergency conditions, programming, rigid or relaxed, is temporarily replaced by an emergency-assist action which permits maximum utilization of the generation capabilities of individual sources.

Further in accordance with the invention, it may be provided that upon termination of an assist-action by a source, its generation will be returned to the value corresponding with programmed sharing of total generation.

Figure 1:
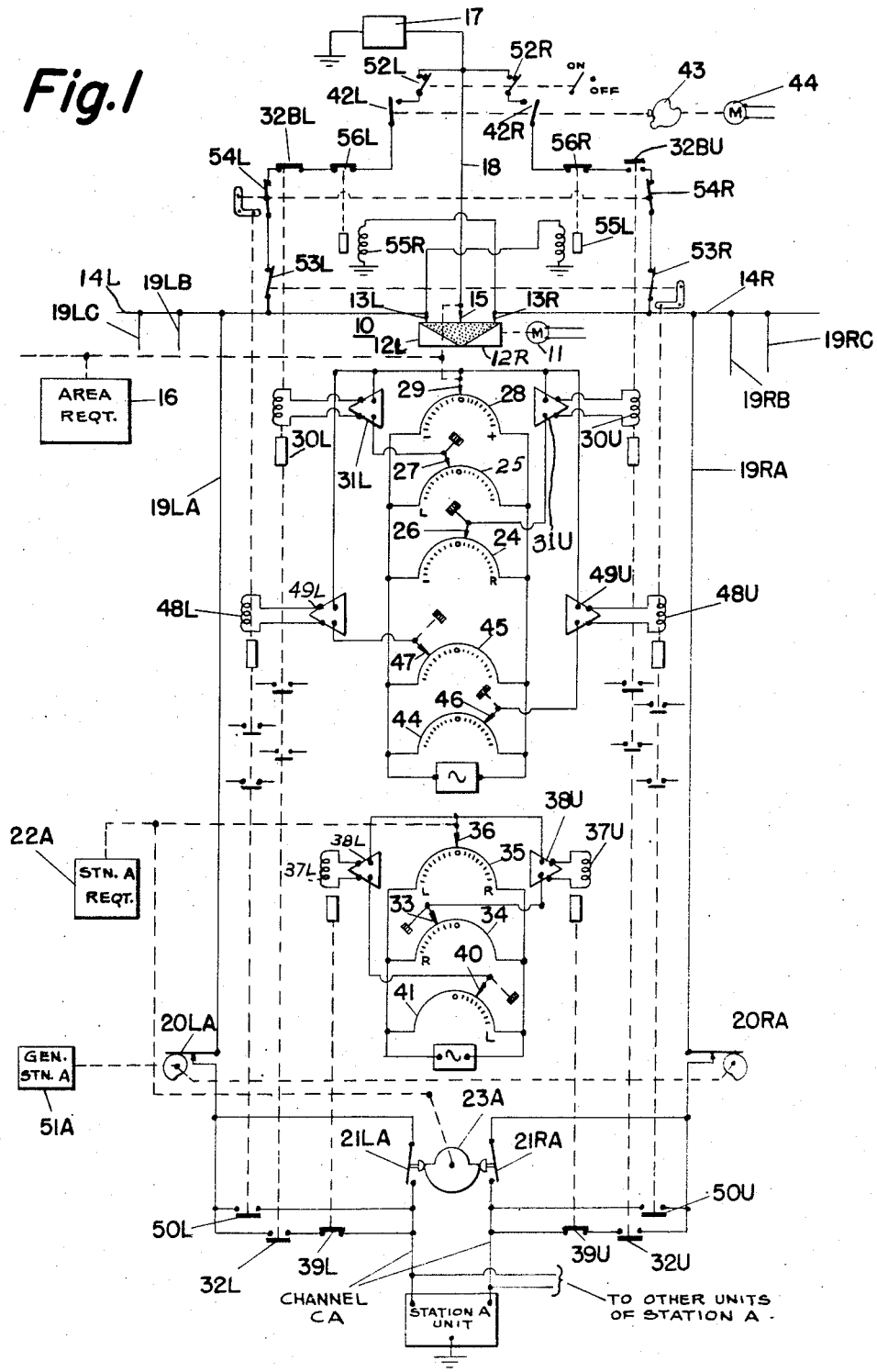
Figure 2:
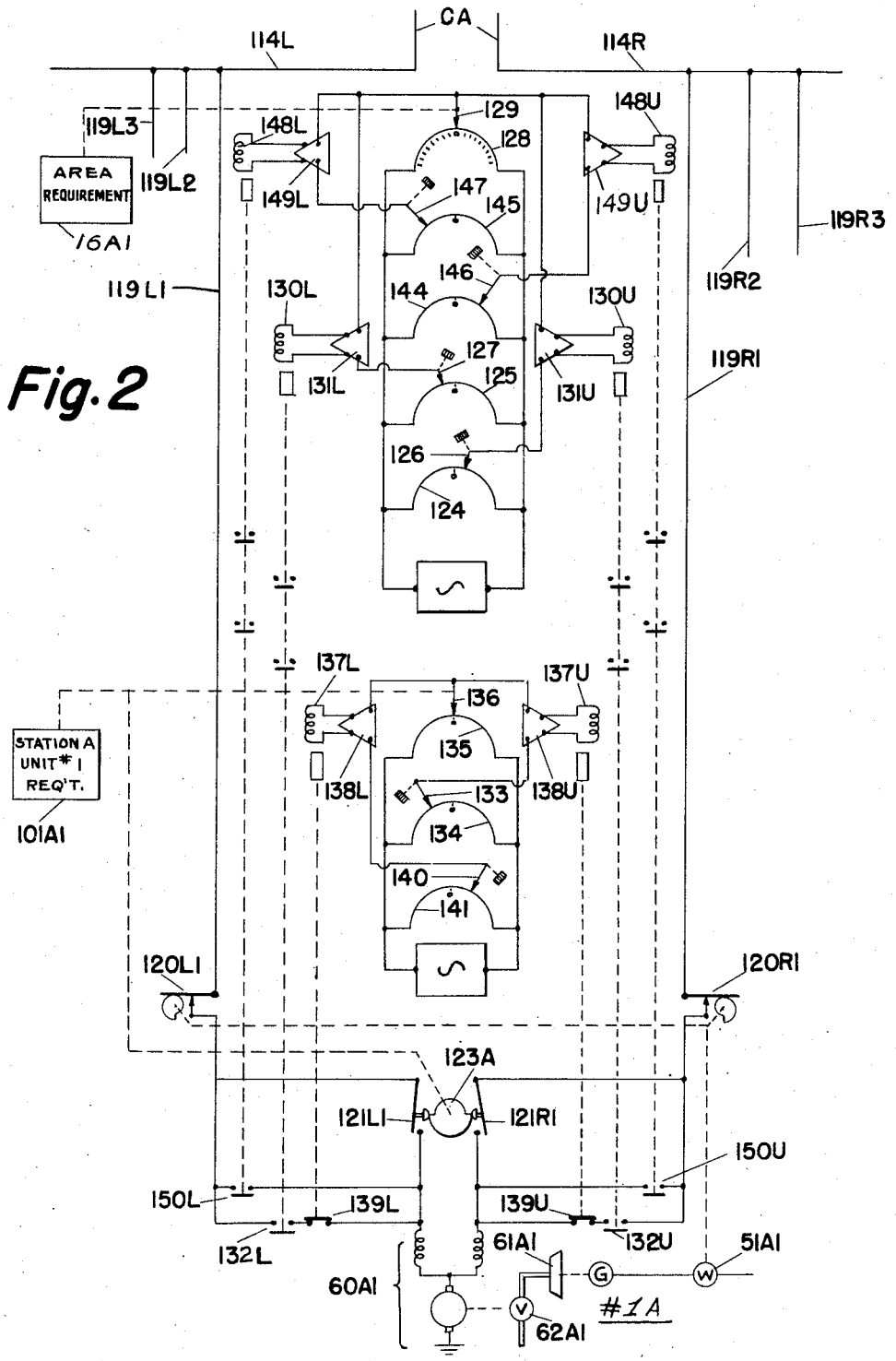
Figure 3:
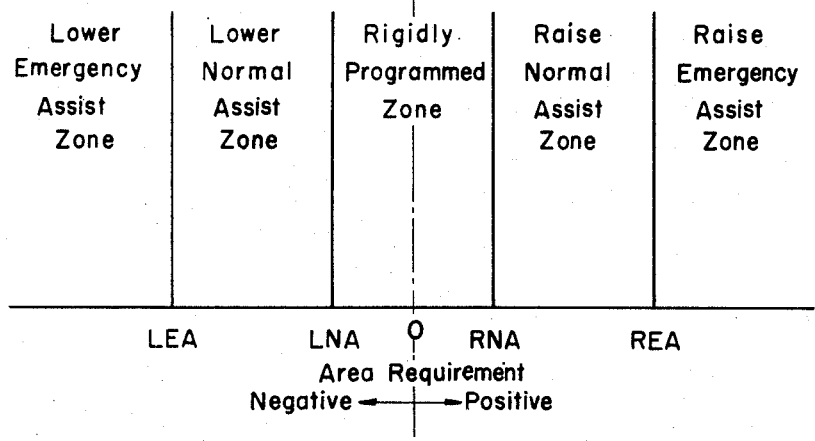
Figure 4:
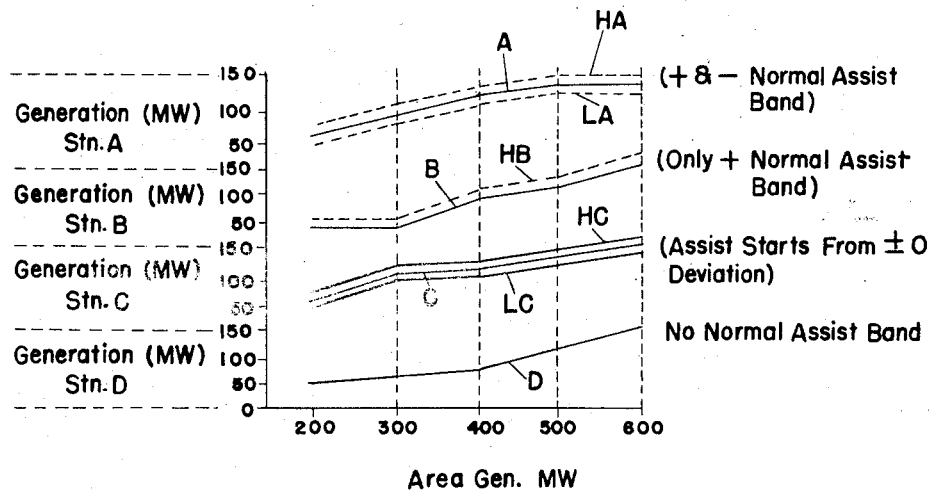

For a more detailed understanding of the invention, reference is made in the following description to the accompanying figures of drawing in which:

Fig. 1 schematically illustrates a station-controlling arrangement at a load-dispatcher's office;

Fig. 2 schematically illustrates a unit-controlling arrangement at a generating station; and Figs. 3 and 4 are explanatory figures referred to in discussion of Figs. 1 and 2.

In my copending application Serial No. 344,838, upon which has issued Letters Patent No. 2,773,994, there is disclosed a control system including computing networks for effecting among stations of an area and among units of a station a predetermined programmed sharing of the total prevailing generation of the area and of any further generation changes required of the area to maintain a predetermined area schedule based on tie-line interchange alone or in combination with other operating factors. Also as more fully disclosed in my aforesaid application, the changes in generation required to maintain such programmed sharing of varying area requirements may be effected by transmission to the stations and their units of Raise or Lower signals demanding manual or automatic change of generation.

As preliminary to a discussion of the present invention, an arrangement for producing and transmitting such signals to the stations of an area is now briefly described.

Referring to Fig. 1, the commutator 10 continuously driven, as by motor 11, has a Raise segment 12R and a Lower segment 12L respectively engaged by brushes 13R, 13L. The contact 15 of commutator 10 is adjustable axially along the commutator from a neutral position to engage one or the other of the commutator segments and is coupled for said adjustment to the Area-requirement indicator or recorder 16. When the area is on schedule, the contact 15 is in the neutral position shown.

Upon deviation from schedule, the contact 15 is moved in a sense and to an extent dependent upon the sense and magnitude of the deviation from zero area requirement. For example, if the schedule deviation is positive, i. e., one requiring increased generation of the area to keep it on schedule, the contact 15 is moved to the right to complete a circuit from the Raise bus 14R to the current source 17 through conductor 18. Conversely, if the schedule deviation is negative, contact 15 is moved to the left from the position shown so that it is periodically engaged by commutator segment 12L to complete a circuit from the Lower bus 14L to current source 17.

Thus in dependence upon the sense of the deviation from area schedule, Raise or Lower pulses are supplied to the bus 14R or to the bus 14L. The duration of the control pulses preferably increases with increasing magnitude of the deviation. To such end, commutator segments 12R, 12L may, as shown, each be of peripheral length which increases from the center to the corresponding end of the commutator.

The Raise or Lower pulses are routed to all controlled stations of the area for sharing of the change in generation required to bring the area back on schedule. For such purpose, the Raise pulses are routed from Raise bus 14R through station control lines 19RA, 19RB, etc. and the Lower pulses are routed from Lower bus 14L through control lines 19LA, 19LB, etc. The pulse transmission paths of lines 19RA, 19LA to the control channel CA for station A respectively include the normally closed limit switches 20RA, 20LA of the generation indicator or recorder 51A for station A and the switches 21RA, 21LA of the station-requirement indicator or recorder 22A for station A. As more fully disclosed in my aforesaid copending application, when the unsatisfied generation requirement for station A is zero, the cam 23A of recorder 22A for station A is in the neutral position shown, and both switches 21RA, 21LA are open; similarly, the corresponding switches of the requirement recorders of the other stations are open if they have zero-generation requirements.

As a starting point for further discussion, it is assumed that station A is to participate in the varying area requirement and that initially the area requirement and the station A requirement are both zero. Thus both contact 15 of commutator 10 and cam 23A of station-requirement recorder 22A are in the neutral position shown. Now upon occurrence of a deviation from area schedule, there results both a new area requirement and a new requirement for station A. Accordingly, because of the area requirement, contact 15 is displaced to provide control pulses as above described and because of the station requirement one or the other of switches 21RA, 21LA is closed by cam 23A, both actions depending upon the sense of the deviation. Raise or Lower signals are thus transmitted to station A over its control channel CA and to the other stations over their corresponding channels CB—CN not shown. When station A has taken its programmed sharing of the new area requirement, its own requirement has returned to zero and consequently both switches 21RA, 21LA are again in open position to preclude further transmission of Raise or Lower signals to station A even though they are still being produced and transmitted over channels CB—CN to those stations of the area whose requirements as yet have not returned to zero.

As thus far described, the arrangement for routing of

Raise or Lower signals from a load-dispatcher's office to stations of his area is similar to that fully disclosed and described in my aforesaid copending application (see for example Fig. 5 thereof). With the arrangement of Fig. 1 as thus far described, the objective is rigid programmed sharing between stations of an area of prevailing area generation and of all new area requirements which occur for deviations from the schedule of the area.

In accord with the present invention, such rigid programming is retained only within a preset zone (RNA—LNA, Fig. 3) of area-schedule deviations (i. e., area requirement); for deviation beyond that zone, the rigid programming of selected stations is relaxed to preset extent to provide what is termed "normal-assist" action.

To set the limits of the area-requirement zone beyond which the normal-assist action occurs, there is provided an area network including slidewires 24, 25 having adjustable contacts 26, 27 respectively set to correspond with the upper and lower limits RNA, LNA (Fig. 3) of of that zone. Each of these slidewires, in combination with slidewire 28, forms a Wheatstone bridge. The contact 29 of slidewire 28 is adjustable by the area-requirement recorder 16. So long as the deviations of area requirement are within the zone so set, the sense of unbalance of each of the bridges is such that the relays 30U, 30L (designated normal-assist relays for identification) remain deenergized. For such state of the normal-assist relays, the only paths for the Raise and Lower pulses to station A are those including the switches 21RA, 21LA of the station-requirement recorder 22A. Thus, within the preset deviation limits, the required area generation change is allocated among the stations on the rigid program basis: with contacts 26, 27 set at zero area requirement, the rigid programming of station A is relaxed upon any deviation from schedule.

It is now assumed that there develops a positive area requirement (i. e., a need for increased generation) of magnitude greater than the setting of contact 26. In this case, the unbalance of the bridge 24, 28 is of such sense that raise-assist relay 30U is energized under control of the sense detector 31U. The sense detector 31U and other sense detectors hereinafter referred to may be of any suitable type such as shown in Patents Nos. 2,698,222 (Fig. 7) and 2,743,097 (Fig. 5).

The energization of relay 30U effects closure of its contact 32U to provide a by-pass circuit around switch 21RA. When station A has increased its generation to assume its rigidly programmed share, the station-requirement recorded 22A has returned contact 36 of station-requirement slidewire 35 to zero-requirement position and through cam 23A opens the switch 21RA as before described but transmission of the Raise pulse to station A continues through the by-pass circuit provided by closed contact 32U of raise-assist relay 30U. Consequently station A continues to increase its generation and contact 36 is moved to the left beyond the zero point into the sector of slidewire 35 corresponding with a "Lower-Requirement" for station A. Similar by-pass circuits for the corresponding switches of the other selected station controllers are established by additional contacts on relay 30U or by the contacts of other raise-assist relays energized concurrently with relay 30U.

As now described, this further increase of generation may continue to a "normal-assist" raise band limit preset for station A as a permissible departure from the rigidly programmed schedule, by adjustment of contact 33 of slidewire 34. This slidewire, together with slidewire 35, forms a Wheatstone bridge supplied from a suitable current source. When in response to the increasing generation of station A the contact 36 is moved to the left beyond a position corresponding with that of aforesaid contact 33 of slidewire 34, the sense of unbalance of the bridge 34, 35 reverses and relay 37U is energized under control of sense detector 38U. Accordingly, the normally-closed contact 39U of relay 37 moves to open position and so interrupts the by-pass circuit to terminate further transmission of Raise pulses to station A. It is to be noted that upon termination of this Raise-assist action, station A is left with a negative generation requirement, i. e., the generation of station A is greater than its rigid program share of the total area generation and contact 36 of the station requirement slidewire 35 is to the left of its zero-requirement position.

A similar arrangement for terminating the raise-assist action is provided for each of the other controlled stations selected to participate in the assist-action. However, such raise-assist action would also be terminated when the positive area requirement has been reduced to the value corresponding to the setting of contact 26 at which time some of these stations may not yet have reached the raise-limit of their respective normal-assist bands.

For example, if the area-requirement, for any reason, becomes less than the value set by contact 26 of slidewire 24 before the requirement of station A reaches its raise normal-assist limit as set by contact 33 of slidewire 34, the station A is left with an excess of generation within the permissible departure from the rigid program.

Again starting from a condition of zero area requirement and zero station requirement, it is now assumed that there develops a negative area requirement (i. e., need for decreased generation) of magnitude greater than the setting of contact 27 of slidewire 25. In this case, the unbalance of bridge 25, 28 of the area-control network is of such sense that lower-assist relay 30L is energized under control of sense detector 31L. The energization of relay 30L effects closure of its contact 32L to provide a by-pass circuit around switch 21LA. Thus even when station A has changed its generation to assume its rigidly programmed share of the generation change, the transmission of Lower pulses to station A nevertheless continues through the by-pass path afforded by closed contact 32L of relay 30L. Consequently station A continues to decrease its generation but not beyond the permissible lower limit of departure from the rigid program predetermined by the setting of contact 40 of slidewire 41. Each of the other normal-assist stations similarly continues to decrease its generation.

When because of such decreasing generation of station A contact 36 is moved by the station-requirement indicator 22A to the right beyond a position corresponding with the setting of contact 40, the sense of unbalance of bridge 35, 41 reverses and relay 37L is energized under control of sense detector 38L. Accordingly, the contact 39L of relay 37L now moves to its open position and so breaks the by-pass circuit to terminate further transmission of Lower pulses to station A. It is to be noted that upon termination of such Lower-assist action, station A is left with a positive generation requirement: i. e., with contact 36 to the right of its zero-requirement position.

The maximum extent of this departure is determined by the setting of normal-assist limit contact 40 which corresponds to the permissible departure in the decrease-generation sense from the rigid program for station A.

By such normal-assist action as applied to one or more stations of an area, deviations from area schedule which fall within the normal-assist zones are more quickly rectified than if rigidly programmed sharing were at all times maintained. Referring to Fig. 4, the curves A, B, C, D are exemplary of rigidly programmed sharing among stations A—D of the total area generation required for maintenance of a schedule. (These curves correspond with curves shown in Fig. 4C of my aforesaid copending application Serial No. 344,838.) The dotted lines HA, LA above and below curve A are the floating limits which define the normal-assist band of station A as preset by its corresponding slidewire contacts 33, 40 and occurring when the area requirement exceeds the setting of contacts 26, 27. The dotted line HB above curve B is the floating limit of the normal-assist band of station B as preset by slidewire contact corresponding with 33: the lower limit of that band corresponds with the rigid program value and therefore the slidewire contact corresponding with 40 is set to zero. The lines HC, LC above and below curve C are floating limits which define the normal-assist band of station C as preset by its slidewire contacts corresponding with contacts 33 and 40. The lines HC, LC are in full to indicate that station C is on normal-assist for any deviation from area schedule: i. e., the contacts 26, 27 of an area network individual to that station are set at zero. The absence from curve D of floating limits indicates that this station has no area-assist action which in the system as thus far described can be obtained by setting the slidewire contacts (corresponding with 33, 40) to zero.

As noted above, with the arrangement as thus far described, the normal-assist action may terminate with one or more of the stations having a positive or negative generation requirement unsatisfied so far as rigid programming of generation is concerned. Subsequent occurrence of area requirement in the opposite direction will result in control action tending to restore rigid programming. However, for return to the rigid program after termination of an area-assist action without awaiting an area requirement of opposite sense, there is provided an arrangement which upon manual closure of switches 52R, 52L supplies restoring pulses to the buses 14R, 14L common to control signal paths for the controlled stations. Specifically, a current path from Raise bus 14R to source 17 includes a switch 42R periodically closed as by cam 43 driven from motor 44. Similarly, a current path from the Lower bus 14L to source 17 is periodically closed by cam-operated switch 42L. As compared to the Raise and Lower pulses provided by commutator 10, the restoring pulses are of short duration and/or occur at low repetition rate. To avoid concurrence of control pulses demanding increase of generation and restoring pulses demanding decrease of generation, and vice versa, the cam 43 may be so timed that the restoring pulses are dephased with respect to the normal control pulses. Additionally or alternatively, the concurrence of a Raise pulse from commutator 10 and a Lower restoring pulse from switch 42L may be precluded by relay 55R which is energized from the Raise control pulses from commutator 10 and whose contact 56L opens to break the path of Lower restoring-pulses. Similarly, relay 55L is energized by the Lower pulses from commutator 10 to open its contacts 56R in the path of the Raise restoring pulses.

The normal-assist relays 30U, 30L may be provided with back contacts 32BU, 32BL respectively to interrupt the paths of the Raise-restoring pulses and the Lower-restoring pulses when the corresponding assist-relay is energized.

As was noted above, the termination of a Raise-assist action may leave station A with a negative or generation-lowering requirement. The station-requirement controller switch 21RA is at that time open and the Raise restoring pulses cannot, as above described, be transmitted to station A. However, the switch 21LA is at this time closed so that the Lower restoring pulses are transmitted to station A for gradual return of its generation requirement to zero, whereupon switch 21LA opens to terminate further transmission of the Lower restoring pulses.

Also as was noted above, the termination of a Lower-assist action may leave station A with a positive or generation-raising requirement. Therefore, switch 21RA is in closed position and provides a path for transmission of the Raise restoring pulses to station A for gradual return of its requirement to zero, whereupon, switch 21RA opens to terminate further transmission of the Raise restoring pulses.

By providing a similar arrangement for the requirement controllers of the other area-assist stations, they can all be gradually returned toward the rigid program after they have participated in a normal-assist action.

The arrangement shown in Fig. 1 also provides for a third type of generation-sharing for unusually large area requirements indicative of emergency conditions of the distribution network. For this purpose, there are provided the slidewires 44, 45 respectively having contacts 46, 47 adjustable to preset for some or all controlled stations the inner boundaries REA, LEA of emergency-assist zones (Fig. 3) above and below the normal-assist zones. Each of these slidewires 44, 45, together with slidewire 28, forms a Wheatstone bridge.

When there exists positive area requirement of such high magnitude that the contact 29 of slidewire 28 is moved to the right of the position corresponding with the setting of contact 46 of slidewire 44, the unbalance of bridge 28, 44 is of such sense that emergency Raise-assist relay 48U is energized under control of sense detector 49U. In consequence, the contact 50U of relay 48U provides a by-pass circuit both for the station requirement controller switch 21RA and for the normal-assist by-pass circuit including contact 32U of the normal-assist raise relay 30U.

Thus Raise pulses continue to be transmitted to station A after it has assumed its rigidly programmed share (switch 21RA opens) and after it has assumed the normal raise-assist generation corresponding with the setting of contact 33 of slidewire 34 (relay contact 39U opens). Accordingly, the generation of station A continues to increase until the limit switch 20RA is opened by the repeater wattmeter or generation recorder 51A for station A. The position of limit switch 20RA for which it opens to break the transmission path for Raise pulses to station A may be predetermined to correspond with the prevailing upper capability or the safe limit of generation of station A.

Similarly when there exists a negative area requirement of such great magnitude that the contact 29 of slidewire 28 is moved by the area-requirement recorder 16 to the left of the position corresponding with the balance setting of contact 47 of slidewire 45, the sense of unbalance of bridge 28, 45 is such that relay 48L is energized under control of sense detector 49L. In consequence, the contact 50L of relay 48L closes to complete a by-pass circuit for the station recorder switch 21LA and also for the normal-assist by-pass circuit including contact 32L of the Lower-assist relay 30L.

Thus the Lower pulses continue to be transmitted to station A after it has assumed its rigidly programmed share (switch 21LA opens) and after it has assumed the normal lower-assist generation corresponding with the setting of contact 40 of slidewire 41 (relay-contact 39L opens). Accordingly, the generation of station A continues to decrease until the limit switch 20LA is opened by wattmeter 51A, or equivalent, to break the path for transmission of Lower pulses to station A.

By providing additional contacts for the emergency-assist relays 48U, 48L or by duplicating such relays for energization concurrently with relays 48U, 48L, the transmission of the Raise and Lower pulses to the other stations may be similarly controlled to provide their participation in the emergency-assist action.

Thus under emergency conditions of the distribution network for which the area requirement deviation exceeds the normal-assist zone, the Raise or Lower pulses produced by commutator 10, or equivalent, are transmitted to all controlled stations until each reaches a predetermined capability or safe limit of its generation in the required direction.

During such emergency conditions, it may be desirable to suspend the restoring action previously described. Such suspension may be effected manually by opening switches 52R, 52L in the pulse-restoring circuit, or it may be effected automatically by relays 48U, 48L. As shown in Fig. 1, relay 48U is provided with contacts 53R, 53L which both open upon energization of that relay to preclude supply of any restoring pulses to any of the stations so long as an emergency deviation requiring increased generation exists. Similarly, emergency-assist relay 48L is provided with contacts 54R, 54L which both open upon energization of that relay to preclude supply of any restoring pulses to the stations so long as there exists an emergency deviation requiring decreased generation.

After an emergency-assist action and upon reduction of the area requirement deviation to within the adjacent normal-assist zone, the restoring pulses may be again applied to the stations for gradual return to the rigidly programmed sharing of load.

In brief résumé of operation of the station-control system of Fig. 1, or any equivalent thereof, so long as the deviations of area requirement are within a normal zone, Raise or Lower pulses are transmitted to each controlled station of the area until each assumes a rigidly programmed share of the generation required of the area to bring it back on schedule: for area requirement deviations within an upper or lower normal-assist zone, the Raise or Lower pulses are transmitted to each station permitting it to assume a generation change not more than a predetermined extent greater or less than its rigidly programmed share of the total generation change required of the area: for area-requirement deviations beyond the upper or lower normal-assist zone and therefore within an emergency-assist zone, Raise or Lower pulses are transmitted to the stations until each has reached a predetermined limit of its generation capability or until said excessive schedule deviations no longer persist.

In the particular arrangement shown in Fig. 1, the assist relays 30L, 30U, 48L, 48U may be provided with additional contacts having the same functions in the area-assist control circuit for other selected area-assist stations as the contacts 32L, 32U, 50L and 50U have for station A. With such arrangement, the area requirement deviations beyond which the normal-assist and emergency-assist actions occur are common for all of such stations as set by the contacts of one set of slidewires 24, 25, 44, 45. Alternatively, additional sets of similar slidewires, contacts and assist relays may be used for individual stations, or sub-groups of stations, for setting different area-requirement values which are to initiate the normal-assist and/or the emergency-assist actions for the individual stations or sub-groups. In such alternative, the same area-requirement slidewire 28 may be used for all bridges, or this slidewire may be duplicated for each station or sub-group of stations and actuated by a common area requirement recorder 16 or by a separate area requirement recorder.

The arrangement described also provides for restoring pulses which are effective upon termination of a normal-assist action gradually to restore rigid programmed sharing of area generation among stations and which are effective to maintain such programmed sharing in the absence of an existing area requirement: such restoring pulses are suspended during emergency conditions.

The selection of normal-assist band limits for the different stations should take into account such factors as ability of the individual stations quickly to change their generation and the permissible range of such rapid generation changes. The selection of the emergency-assist limits for the different stations is based upon their ultimate generation capabilities.

At each of the stations, the pulses may be converted to visible signals for compliance by a station operator with the indicated demand for increased or decreased generation. Preferably, however, these control actions may be repeated at station level for automatic control of the generation of individual units of a station so that for a preset zone of small deviations of area requirement, units of each controlled station will accept Raise or Lower pulses only until each assumes its rigidly programmed share of the station requirement, but for larger area requirements will accept the pulses beyond programmed sharing to provide normal-assist or emergency-assist action. An arrangement suited for automatic control of one of the units of a station is shown in Fig. 2. A similar arrangement for control of any other unit of station A or other station of the area may be used.

At station A, the Raise and Lower pulses received over communication link CA from the load-dispatcher's office are utilized to control the direction of energization of motors or other devices which directly or through speed governors vary the inputs to the prime mover of the generating units. Specifically, as shown in Fig. 2, the Raise pulses are supplied to the Raise bus 114R for routing by unit control lines 119R1, 119R2, etc. to controllers for the several generating units and the Lower pulses are supplied to the Lower bus 114L for routing by control lines 119L1, 119L2 etc. to the respective unit controllers.

It is first assumed that there exists a positive area requirement between the normal-assist zone settings LNA, RNA (Fig. 3) that station A has not yet picked up its proportionate programmed share of the required increase in area generation, and that unit #1 of station A has not yet assumed its proportionate programmed share of the required increase of station generation. In such case, the switch 121R1 of the unit requirement recorder/controller 101A1 is closed so that the Raise pulses transmitted to station A through contacts 21RA of the station-requirement controller 22A (Fig. 1) are transmitted over the feed line 119R1 to the reversible motor 60A1 or equivalent to effect an increase of input to the prime mover 61A1 of generating unit #1A. The motor 60A1 may actuate the input valve or gate 62A1 directly or through a speed governor in manner per se known. When unit #1A picks up its share of the station requirement, the unit-requirement instrument 101A1 opens switch 121R1 to preclude further transmission of the Raise pulses at that unit.

It is now assumed that there exists a negative area-requirement smaller than the inner limit of the normal-assist zone, that station A has not dropped its programmed share of the required decrease in area generation, and that unit #1A of station A has not assumed its programmed share of the required decrease of station generation. In such case, the switch 121L1 of instrument 101A1 is closed. Thus, the Lower pulses are transmitted to motor 60A1 to effect decrease of input to unit #1A. When unit #1A has dropped its share of the negative station requirement, the switch 121L1 is opened by controller 101A1 to preclude further transmission of the Lower pulses to that unit.

The other controlled generating units of station A are similarly controlled to effect rigidly programmed sharing among them of the station requirement when the deviation of area requirement is between the inner limits RNA, LNA of the normal-assist zones. Computer networks suited to effect this type of control operation for unit-controllers of a station are fully disclosed in my aforesaid copending application (see Fig. 10 thereof).

In accordance with the present invention, such rigidly programmed sharing of station requirement among units of a station is retained within a preset zone of area-requirement deviations. To set limits of the normal-assist zone for unit #1A, there is provided a network similar to that shown in Fig. 1 for individual stations of an area. Specifically, in Fig. 2 the contact 129 of slidewire 128 is adjustable by an area-requirement indicator/recorder instrument 16A1. The adjustable contacts 126, 127 of slidewires 124, 125 are respectively set to correspond with the selected upper and lower limits of the Raise and Lower assist zones.

So long as the deviations of area requirement are between the assist zones so set, the normal-assist relays 130U, 130L in the output circuits of the bridges 124, 128 and 125, 128 remain deenergized so that the only paths for the Raise and Lower pulses are those including switches 121R1 and 121L1 of the unit-requirement instrument 101A1. Thus within the preset limits of area requirement deviation, the required station generation changes are allocated among the station units on a rigidly programmed sharing basis.

It is now assumed that a positive area requirement of magnitude greater than the setting of normal-assist contact 126 exists. In this case, the unbalance of bridge 124, 128 is of such sense that Raise-assist relay 130U is energized under control of sense detector 131U. The resulting closure of contact 132U of relay 130U provides about the contacts of unit-controller switch 121R1 a by-pass circuit for transmission of the Raise pulses to unit #1A. When unit #1A has increased its generation to assume its rigidly programmed share of the generation increase demanded of station A, the switch 121R1 opens as above described, but transmission of the Raise pulses to unit #1A continues through the by-pass path provided by closed contact 132U of relay 130U. Consequently unit #1A continues to increase its generation.

This increase of generation may continue to an upper assist limit preset for unit #1A with respect to its assigned program by adjustment of contact 133 of slidewire 134. This slidewire, together with slidewire 135, forms a bridge network supplied from a suitable current source. The contact 136 of slidewire 135 is adjustably positioned by the controller 101A for unit #1A. When, because of the still further increased generation, contact 136 is moved to the left beyond a position corresponding with the setting of contact 133, the sense of unbalance of bridge 134, 135 reverses and relay 137U is energized under control of sense-detector 138U. Accordingly contact 139U of relay 137U moves to open position and so breaks the by-pass circuit to terminate further transmission of Raise pulses to unit #1A. Upon termination of such normal Raise-assist action, unit #1A may be left with a negative generation requirement; i. e., with contact 136 to the left of the zero unit-requirement position.

Again starting from a condition of zero area-requirement, of zero station-requirement, and of zero unit-requirement, it is now assumed there occurs a negative area requirement of magnitude greater than the setting of contact 127 of slidewire 125. In this case, the unbalance of bridge 125, 128 is of such sense that Lower-assist relay 130L is energized under control of sense-detector 131L. The resulting energization of relay 130L effects closure of its contact 132L to provide a by-pass circuit around the contacts of unit-controlled switch 121L1. Thus, when unit-controller switch 121L1 opens upon assumption by unit #1A of its rigidly programmed share of the required decrease in station generation, the transmission of lower signals to unit #1A nevertheless continues through the by-pass path afforded by contact 132L. Consequently unit #1A continues to decrease its generation to a lower-assist limit predetermined with respect to its assigned program by the setting of contact 140 of slidewire 141.

When because of such decreasing generation contact 136 is moved by unit controller 101A to the right beyond a position corresponding with the setting of contact 140, the sense of unbalance of bridge 135, 141 reverses and lower-assist limit relay 137L is energized under control of sense-detector 138L. Accordingly, the contact 139L of relay 137L moves to open position and so breaks the by-pass circuit to terminate further transmission of Lower pulses to unit #1A. Upon termination of the Lower-assist action by unit #1A, it may be left with a positive generation requirement, i. e., with contact 136 to the right of the zero unit-requirement position.

From the foregoing description of Fig. 2, it will be understood that upon termination of a normal area-assist action that the units of station A may be left with a positive or negative generation requirement. However, as was pointed out in discussion of Fig. 1, restoring pulses are supplied to channel CA for station A so long as station controller 22A is not in zero station-requirement position. Consequently, after termination of a normal area-assist action and so long as the requirement for station A is not zero, there are transmitted to the generating units of station A restoring pulses of proper sign effective to minimize the deviation from rigidly programmed sharing of load among the units of station A. The restoring pulses as supplied to control lines 119R1, 119L1 for unit #1A are therefore transmitted to the input control motor 60A1 through unit controller switch 121R1 or 121L1 until the controller 101A1 opens that switch upon restoration of zero-requirement for unit #1A.

For participation by units of a station in the area emergency-assist action, there are provided slidewires 144, 145 having contacts 146, 147 respectively adjustable to preset the inner boundaries beyond which emergency-assist exists. Each of these slidewires combines with slidewire 128 to form a Wheatstone bridge.

When there exists a positive area requirement of such high magnitude that the contact 129 of slidewire 128 is moved by area-requirement recorder 16A1 to the right of the balance positions corresponding with the setting of contact 146 of slidewire 144, the sense of unbalance of bridge 128, 144 is such that emergency Raise-assist relay 148U is energized under control of sense-detector 149U. In consequence, the contact 150U of relay 148U is closed to complete a by-pass circuit both for controller switch 121R1 and for the normal assist by-pass circuit including contact 132U of the Raise-assist relay 130U. Thus, Raise pulses continue to be supplied to motor 60A1 of unit #1A after unit #1A has assumed its rigidly programmed share (switch 121R1 opens) and after it has further increased its generation to the limit permitted for normal-assist action (relay contact 139U opens). Accordingly, the generation of unit #1A continues further to increase until high generation limit switch 120R1 is opened by the unit wattmeter 51A1. The open position for switch 120R1 may be preset to correspond with the upper prevailing capability or safe limit of generation for unit #1A.

Similarly, when there exists a negative area requirement of such great magnitude that contact 129 is moved by area-requirement recorder 16A1 to the left of the balance position corresponding with the setting of contact 147 of slidewire 145, the unbalance of bridge 128, 145 is of such sense that emergency Lower-assist relay 148L is energized under control of sense-detector 149L. In consequence, the contact 150L of relay 148L is closed to complete a by-pass circuit both for the unit-controller switch 121L1 and for the normal-assist by-pass circuit including contact 132L of the Lower-assist relay 130L.

Thus Lower pulses continue to be transmitted to input control motor 60A1 after unit #1A has assumed its rigidly programmed share (switch 121L1 opens) and after it has assumed the additional generation decrease permitted for the normal-assist action (relay contact 139L opens). Accordingly, the generation of unit #1A continues to decrease until the low generation limit switch 120L1 is opened by unit wattmeter 51A1.

As above pointed out in discussion of Fig. 1, restoring pulses are not transmitted to the stations under emergency conditions and hence under such conditions no restoring pulses are transmitted to the units of the station.

In brief résumé of the operation of the system of Fig. 2, or any equivalent thereof, for deviations of area requirement within a preset zone, units of each controlled station respond to Raise or Lower pulses until each unit assumes its rigidly programmed share of the total prevailing station generation and of any generation change required of the station; for area-requirement deviations within upper or lower normal assist zones, the units respond to raise or lower pulses permitting each to assume a generation change not more than a predetermined extent greater than its rigidly programmed share of the total generation required of the station; for excessive schedule deviation beyond the upper or lower normal-assist zones, the units respond to any raise or lower pulses until each has reached a predetermined limit of its generation capability or until said excessive schedule deviation no longer persists.

The selection of normal-assist band limits for individual units will take into account characteristics of the respective units, such as ability quickly to change generation and the range of quick generation change.

In the particular arrangement shown in Fig. 2, the assist relays 130L, 130U, 148L, 148U may be provided with additional contacts having the same functions in the area-assist control circuit for other units of station A as the contacts 132L, 132U, 150L, 150U have for unit #1A of station A. With such arrangement, the area-requirement deviation beyond which the normal-assist and emergency-assist actions occur are common for all of such units of the station as set by the contacts of one set of slidewires 124, 125, 144, 145. Alternatively, additional sets of similar slidewires, contacts and assist relays may be used for individual units, or sub-groups of units for setting different area-requirement values which are to initiate the normal-assist and emergency-assist actions for individual units, or sub-group of units of the station. Generally, with units controlled as herein described, the summation of the normal-assist bands of the controlled units of a station as set by slidewires 134, 141 and their equivalents for other units of the station, is equal to or greater than the normal-assist band of the station as set by slidewires 34, 41. The selection of emergency-assist limits for the individual units of a station is based upon their respective safe generation limits. Again assuming that all units are controlled as herein described, the summation of the emergency-assist limits of the individual units will correspond with the emergency-assist limits of the station.

From the foregoing, it should be evident that a station or a unit may be kept on rigidly programmed control, independently of all other settings except emergency-assist, by adjusting the corresponding floating limits that define the normal-assist band for that station or unit to zero. If this is done at the station level, the rigidity is not necessarily passed on to the units which might, other settings being considered, provide normal station assist-action to more rapidly return the station to its rigidly programmed share. Another way in which the stations or units may be kept on rigidly programmed control is to set the normal-assist zone limits for the station or unit beyond its emergency-assist zone limit settings. In either of the above cases, of course, the emergency-assist action would override the rigid control.

Instead of producing at the load dispatcher's office the restoring pulses for the units of all controlled stations, each controlled station may have its own arrangement for producing the restoring pulses. Thus, if a station is always on rigid program (curve D of Fig. 4), its units nevertheless can have a station-assist action and upon termination of such action they will be returned to rigidly programmed sharing by the restoring pulses produced at station level.

What is claimed is:

1. A system for controlling the generation of two or more sources operating under a schedule comprising means preset to define a zone of deviations from schedule, means responsive to deviations from schedule for producing Raise or Lower signals for transmission to said sources, control means effective within said deviation zone to provide transmission of said Raise or Lower signals to said sources until each assumes a predetermined programmed share of both the total prevailing generation and of the generation change required of said sources to correct the existing deviation, and control means effective for deviations beyond said zone to provide continued transmission of Raise or Lower signals to at least one of the sources after it has assumed its programmed share to effect further change of the generation thereof within the limits of upper and lower normal-assist bands preset for that source as permissible departures above and below said programmed share.

2. A system as in claim 1 additionally including means for producing restoring signals of opposite senses, and means effective to transmit restoring signals demanding gradual decrease of generation to sources having a negative-generation requirement and to transmit restoring signals demanding gradual increase of generation to sources having a positive generation requirement.

3. A system as in claim 1 additionally including means preset to define for still greater deviations from schedule emergency-assist zones above and below the normal-assist zones, and control means effective within the emergency-assist zones to provide transmission of Raise or Lower signals to each of said sources for change of the generation thereof within the limits preset for that source as upper and lower generation limits.

4. A system as in claim 3 additionally including means for producing restoring signals of opposite senses, means to transmit said restoring signals for gradual restoration of rigidly programmed sharing of required generation among said sources, and means effective for schedule deviations within the emergency-assist zones for suspending transmission of restoring signals to said sources.

5. A system for controlling the generation of two or more stations operating under an area schedule comprising means preset to define normal-assist zones of deviations from area schedule, means responsive to deviations from area schedule for producing Raise and Lower signals, control means for each of said stations and effective for deviations within the inner limits of said zones to provide transmission to its station of Raise or Lower signals until that station assumes its programmed share both of the total prevailing generation and of the generation change required of the area, means preset to define for an individual station the limits of a normal area assist-band relative to its said programmed share, and control means for each of said stations effective within each of said assist zones to provide continued transmission to that station of Raise or Lower signals after the station has assumed its said programmed share of generation for further change of the generation thereof within the preset limits of its assist-band.

6. A system as in claim 5 additionally including means for producing restoring signals demanding gradual decrease of generation by stations having a negative-generation requirement and demanding gradual increase of generation by stations having a positive generation requirement.

7. A system as in claim 5 additionally including means preset to define for still greater deviations from schedule emergency area-assist zones above and below the normal area-assist zones, and control means for each of the stations effective within each of said emergency-assist zones to provide transmission of Raise or Lower signals to that station for change of generation within limits preset for that station as upper and lower generation limits.

8. A system as in claim 7 additionally including means for producing restoring pulses respectively demanding gradual increase and gradual decrease of generation, means to transmit to the stations restoring signals of the sense effecting return to programmed sharing of total generation, and means effective for schedule deviations within the emergency area-assist zones to suspend transmission of said restoring signals.

9. A system for controlling the generation of two or more generating units of a station operating under an area schedule comprising means preset to define normal-assist zones of deviations from area schedule, means responsive to deviations from area schedule for producing Raise and Lower signals, control means for each of said units and effective for deviations within the inner limits of said zones to provide transmission to its unit of Raise or Lower signals until that unit assumes its programmed share both of the total prevailing station generation and the generation change required of the station, means preset to define for an individual unit the limits of a normal-assist band relative to its said programmed share, and control means for at least one of said units effective within said zones to provide continued transmission to that unit of Raise or Lower signals after the unit has assumed its said programmed share of the station generation to effect further change of the generation thereof within the preset limits of its normal-assist band.

10. A system as in claim 9 additionally including means for producing restoring signals, and means to transmit restoring signals demanding gradual decrease of generation by units having a negative generation requirement and effective to transmit restoring signals demanding gradual increase of generation by units having a positive generation requirement.

11. A system as in claim 9 additionally including means preset to define for still greater deviations from schedule the limits of emergency area-assist zones above and below the normal area-assist zones, and control means for each of said units effective within said emergency-assist zones to provide transmission of Raise or Lower signals to that unit for change of the generation within limits preset for that unit as upper and lower generation limits.

12. A system as in claim 11 additionally including means for producing restoring signals, means to transmit said restoring signals for gradual restoration of programmed sharing of station requirements among the units, and means effective for schedule deviations within the emergency-assist zones for suspending transmission of restoring signals to said units.

13. A system for controlling the generation of a group of two or more interconnected generating sources operating under a schedule which comprises means for presetting a zone of deviations from group schedule, means for presetting for the individual sources the limits of normal-assist bands, means effective within said preset zone to change the generation of the individual sources until each assumes a rigidly programmed share of the total generation required for correction of the deviation, and means effective for deviations beyond said preset zone further to change the generation of each of the individual sources until the deviation is reduced to within said preset zone or until the generation of that source reaches a preset limit of its normal-assist band.

14. A system as in claim 13 which additionally includes means for presetting emergency-assist zones, and means effective when deviations from schedule fall within said zones, further to change the generation of each of the individual sources toward an upper or lower emergency generation limit preset for that source.

15. A system as in claim 13 additionally including means for slowly changing the generation of the individual sources in a sense to approach its rigidly programmed share of total generation.

16. A system for controlling the generation of two or more sources operating under a group schedule comprising means for determining the share of the group generation that should be carried by each of said sources, means for presetting for at least one of said sources normal-assist band limits relative to its share of group generation, means responsive to deviations from said group schedule for changing the generation of the sources to their predetermined share for return of said system to said group schedule, and means for permitting change of the generation of said one of said sources by said deviation-responsive means beyond its predetermined share by an amount within said preset normal-assist limits.

17. A system as in claim 16 in which the last-named means is effective only for deviations from group schedule in excess of a predetermined magnitude.

18. A system as in claim 16 including additional control means for gradually restoring the generation of said one of said sources to its predetermined share of said group generation.

19. A system as in claim 16 including means for presetting for at least one of said sources emergency-assist generation limits, and control means effective upon deviation from group schedule of magnitude indicative of emergency conditions for permitting change of the generation of that source by said deviation-responsive means beyond its predetermined share by an amount within said preset emergency-assist limits.

20. A system for controlling the generation of two or more sources operating under a schedule comprising means responsive to deviations from schedule for producing Raise or Lower signals for transmission to said sources, control means effective to provide transmission of said Raise or Lower signals to said sources until each assumes a predetermined programmed share of both the total prevailing generation and of the generation change required of said sources to correct the existing deviation, and other control means effective to provide alternative transmission paths for said Raise or Lower signals to at least one of said sources to effect change of generation beyond its programmed share within the limits of upper and lower normal-assist bands preset for that source as departures above and below the aforesaid programmed share.

References Cited in the file of this patent

UNITED STATES PATENTS

| | | |
|---|---|---|
| 2,050,338 | Kerr | Aug. 11, 1936 |
| 2,624,015 | Herwald et al. | Dec. 30, 1952 |
| 2,692,342 | Nichols et al. | Oct. 19, 1954 |
| 2,698,222 | Davis | Dec. 28, 1954 |
| 2,743,097 | Carolus et al. | Apr. 24, 1956 |
| 2,773,994 | Cohn | Dec. 11, 1956 |